(No Model.)
F. A. STEVENS.
TRIP FASTENER.
No. 485,511.
Patented Nov. 1, 1892.
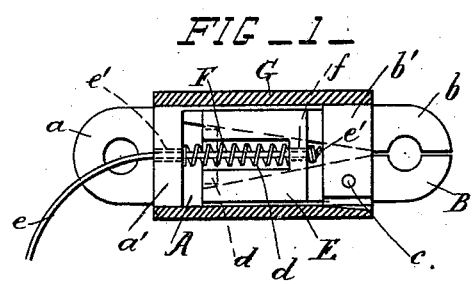
FIG_1_
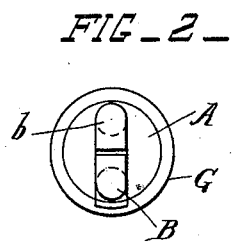
FIG_2_
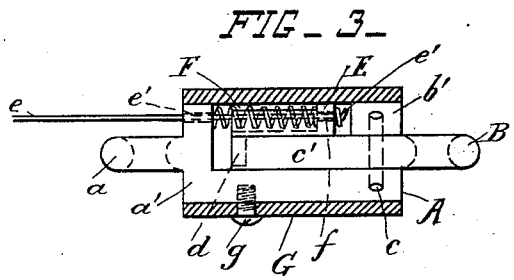
FIG_3_
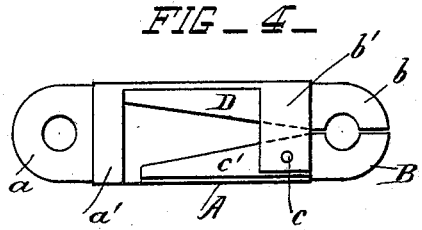
FIG_4_
Witnesses
Wm H Bates
John Cullen
Inventor
Fred A. Stevens.
By his Attorney
Herbert W. T. Jenner.

UNITED STATES PATENT OFFICE.

FRED A. STEVENS, OF BROOKTON, NEW YORK.

TRIP-FASTENER.

SPECIFICATION forming part of Letters Patent No. 485,511, dated November 1, 1892.

Application filed July 1, 1892. Serial No. 438,696. (No model.)

*To all whom it may concern:*

Be it known that I, FRED A. STEVENS, a citizen of the United States, residing at Brookton, in the county of Tompkins and State of New York, have invented certain new and useful Improvements in Trip-Fasteners; and I do hereby declare the following to be a full, clear, and exact description of the invention, such as will enable others skilled in the art to which it appertains to make and use the same.

This invention relates to fasteners used for various purposes—as, for instance, for uniting the separable portions of a hay-sling, and which are provided with trip mechanism whereby the said separable portions or other objects are released when desired.

This invention consists in the novel construction and combination of the parts hereinafter fully described and claimed.

In the drawings, Figure 1 is a side view of the fastener, showing the case in section. Fig. 2 is an end view of the fastener. Fig. 3 is a side view of the fastener the same as Fig. 1, but turned one-quarter around. Fig. 4 is a detail side view of the main portion of the fastener with the lock-piece removed.

A is the main portion of the fastener, provided at one end with the eye $a$ and the circular flange $a'$. The fastener is provided with a semicircular hook $b$ at its other end and a slotted flange $b'$.

B is a semicircular hook pivoted on the pin $c$ in the slot of the flange $b'$ and provided with a shank $c'$, extending in line with the main portion A nearly as far as the flange $a'$, when the two hooks B and $b$ are pressed together and form a circular eye.

D is a bar formed on the main portion A between the flanges $a'$ and $b'$ on the side opposite to the shank $c'$.

E is the lock-piece, which rests upon the bar D and the shank $c'$. This lock-piece is vided with a projection $d$ on its flat side and a recess $d'$ on its convex side.

F is a spiral spring in the recess $d'$, which presses one end of the lock-piece toward the flange $b'$ and normally holds the projection $d$ between the shank $c'$ and the bar D, thereby retaining the hook B in the position shown in Fig. 1. A cord $e$ passes through a hole $e'$ in the flange $a'$, through the spring F, and through a hole $f$ in the lock-piece E. The cord $e$ is secured to the lock-piece E by means of the knot $e'$, so that when the cord is pulled the lock-piece is drawn back against the pressure of the spring F.

G is a cylindrical case, which is slid over the flanges $a'$ and $b'$ and is secured to the main portion A by the screw $g$.

When the parts are in the position shown in Fig. 1, any objects connected to the ends of the fastener are secured together. The objects are released by pulling the cord $e$ until the projection $d$ is drawn beyond the end of the shank $c'$. The hook B is then free to turn on its pivot, and the object attached to the said hooks B and $b$ is automatically released.

What I claim is—

1. The combination, with the main portion of the fastener, provided with a longitudinal bar on one side of it and having an eye at one end and a hook at the other, of a hook provided with a shank pivoted to the said main portion and adapted to close against the aforesaid hook, and a retractible spring-pressed lock-piece resting on said bar and shank and provided with a projection normally holding the said two hooks together, substantially as set forth.

2. The combination, with the main portion of the fastener, provided with an eye at one end and a hook at the other and having circular end flanges and a longitudinal bar on one side of it between the said flanges, of the cylindrical case secured over the said flanges, a pivoted hook provided with a shank, and a retractible spring-pressed lock-piece resting on said bar and shank inside the casting and provided with a projection normally holding the said two hooks together, substantially as set forth.

3. The combination, with the main portion of the fastener, provided with the eye $a$, the flange $a'$, the bar D, the slotted flange $b'$, and the hook $b$, of the hook pivoted in the said slotted flange and provided with the shank $c'$, the lock-piece provided with a projection normally resting between the said shank and bar, the spiral spring, a cord for pulling back the lock-piece against the pressure of the spring, and thereby liberating the hook B, and the cylindrical case inclosing the middle portions of the fastener, substantially as set forth.

In testimony whereof I affix my signature in presence of two witnesses.

FRED A. STEVENS.

Witnesses:
FRED J. MARSH,
JOHN SABIN.